(12) United States Patent
Harada et al.

(10) Patent No.: US 7,023,464 B1
(45) Date of Patent: Apr. 4, 2006

(54) VISUAL TELEPHONE

(75) Inventors: Hideo Harada, Hamamatsu (JP);
Tomiyo Ema, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 150 days.

(21) Appl. No.: 09/913,383

(22) PCT Filed: Nov. 8, 2000

(86) PCT No.: PCT/JP00/07850

§ 371 (c)(1),
(2), (4) Date: Aug. 13, 2001

(87) PCT Pub. No.: WO01/45405

PCT Pub. Date: Jun. 21, 2001

(30) Foreign Application Priority Data

Dec. 14, 1999  (JP) ............................. P. 11-354736

(51) Int. Cl.
*H04N 7/14* (2006.01)
(52) U.S. Cl. .............................. 348/14.01; 348/14.02; 348/14.108
(58) Field of Classification Search .. 348/14.01–14.03, 348/14.07–14.09, 14.1, 14.12–14.16, 211.12; 379/93.21, 202, 93.31, 202.01; 709/204; 345/258, 753; 358/452–453, 448; 715/753; 370/260

See application file for complete search history.

(56) References Cited

U.S. PATENT DOCUMENTS 5,786,846 A * 7/1998 Hiroaki .................... 348/14.16
6,313,864 B1 * 11/2001 Tabata et al. ............ 348/14.02
6,344,907 B1 * 2/2002 Watanabe et al. ........... 358/448

FOREIGN PATENT DOCUMENTS

| JP | 4-156083 A |   | 5/1992 |
| JP | 6-46414 A |   | 2/1994 |
| JP | 7-30871 A |   | 1/1995 |
| JP | 7-154761 A |   | 6/1995 |
| JP | 07154761 A | * | 6/1995 |

* cited by examiner

Primary Examiner—Melur Ramakrishnaiah
(74) Attorney, Agent, or Firm—Pearne & Gordon LLP

(57) ABSTRACT

A video telephone is provided which makes it possible to speak while seeing a motion picture of a partner side and while protecting the portrait right of a calling party using the video telephone as the need arises.

At the time of communication, an image pickup unit (2) pickups a photogenic subject (1) such as a calling party and peripheral environment etc. A pickup signal processing unit (3) processes a pickup signal corresponding to an image of the photogenic subject (1) pickup by the image pickup unit (2) to thereby generate a pickup image signal. A portrait right correspondence image processing unit (4) subjects the pickup image signal to an image modification processing such as a defocusing processing so as to protect the portrait right of the calling party. An image signal selection unit (5) is selectively operated, in accordance with an operational instruction based on the determination of the calling party, to transmit a modified image signal subjected to the image modification processing or to transmit the pickup image signal as it is. A communication unit (6) transmits the pickup image signal from the pickup signal processing unit (3) or the modified image signal from the portrait right correspondence image processing unit (4).

25 Claims, 5 Drawing Sheets

VISUAL TELEPHONE

TECHNICAL FIELD

The present invention relates to a video telephone for transmitting an image of a calling party together with speech voice and, in particular, relates to a video telephone adapted to be able to protect a portrait right relating to privacy etc. of the calling party upon using it.

BACKGROUND OF THE INVENTION

Video telephones are characterized in that image pickup cameras thereof take images of calling and called parties, respectively, so that the calling and called parties can speak to each other while seeing the partner sides. However, there is a case that it is troublesome due to the calling party's convenience to take an image of the calling party, such as a case that the calling party does not want to make the person on the partner side know the circumstance of the calling party in detail. In this case, the portrait right of the picked up image, for example, the privacy of the calling party should be protected.

As a general countermeasure in the case of requiring the protection of such privacy etc., there is a method that a person leaves from the image pickup camera. However, in this case, it may become difficult to speak depending on the relative positional relation between the person and a receiver/microphone in a portable device, in particular. Further, as another countermeasure, it is considered to turn off an image to be transmitted. However, in each of these countermeasures, there arises a sense of incongruity that the calling and called parties can not see the partner sides to each other despite of using the video telephone.

Further, as another countermeasure, it is considered to provide a means for transmitting an image representative of a name card picked up in advance. However, in this case, there arises a problem that a present state of the partner side can not be seen well since the transmitted image is a static image.

In this manner, each of the aforesaid countermeasures has a problem that the communication is equal to that using only voice and so the telephone is not necessarily required to be a video telephone, so that a calling party can not sufficiently use the function of the video telephone. Thus, at present, the video telephones have not been spread sufficiently due to the problem of such a portrait right.

The invention has been made in view of the aforesaid circumstances and an object of the invention is to provide a video telephone which makes it possible to speak while seeing a motion picture of a partner side and while protecting the portrait right of a calling party using the video telephone as the need arises.

DISCLOSURE OF THE INVENTION

In order to attain the aforesaid object, the video telephone according to the invention is arranged to include image pickup means which shoots a photogenic subject and generates a pickup signal; pickup signal processing means which processes the pickup signal and outputs a pickup image signal; image modification processing means which subjects the pickup image signal to an image modification processing for protecting a portrait right; image signal selection means which selects one of the pickup image signal from the pickup signal processing means and a modified image signal from the image modification processing means; and communication means which transmits an output image signal from the image signal selection means.

Further, the image signal selection means selects and outputs the modified image signal from the image modification processing means at a time of starting communication, and thereafter selects and outputs the pickup image signal from the pickup signal processing means in response to an operational instruction from a calling party. Alternatively, the image signal selection means selects and outputs the modified image signal from the image modification processing means at a time of starting communication, and selects and outputs the pickup image signal from the pickup signal processing means in response to confirmation of authentication of a partner side of a calling party thereafter.

Further, the image modification processing means performs a defocusing processing for placing an image based on the pickup image signal in a defocused state. Alternatively, the image modification processing means performs a deforming processing for converting the two-dimensional positional information of pixels in the pickup image signal at an arbitrary ratio. Alternatively, the image modification processing means performs a resolution reducing processing for reducing a resolution of the pickup image signal. Alternatively, the image modification processing means performs a tone resolution reducing processing for reducing a tone resolution of the pickup image signal.

According to the video telephone of the invention, the image pickup means pickups a photogenic subject and generates a pickup signal; the pickup signal processing means processes the pickup signal and outputs a pickup image signal; the image modification processing means subjects the pickup image signal to the defocusing processing; the image signal selection means selects one of the pickup image signal from the pickup signal processing means and a modified image signal from the image modification processing means; and the communication means which transmits an output image signal from the image signal selection means.

In this manner, the video telephone according to the invention is provided with the image modification processing means which subjects the pickup image signal to the defocusing processing and transmits the modified image thus obtained which is not a pickup image as it is due to the calling party's convenience thereby to protect a portrait right, in the case where it is troublesome for a calling party if a pickup image of the calling party is sent as it is. When the calling party's convenience is eliminated, the image to be selected by the image signal selection means is immediately changed from the modified image for protecting the portrait right to the pickup original image so that the original function of the video telephone can be attained, that is, a speech is made possible while seeing a motion image.

In this respect, a portrait right is protected in the two manners, that is, (1) an image of the partner side is processed to a degree that a state of a partner side is scarcely recognized such that a calling party can not clearly recognize the partner side or it is unclear whether a person on the partner side is dressed or not (high-grade protection); and (2) an image of the partner side is processed to a degree that a state of a partner side is not recognized in detail such that a calling party can almost recognize a person on the partner side but cannot recognize an expression or can not recognize whether or not the person wears makeup or has just waked up (low-grade protection).

In this case, the image modification processing means performs, as the image modification processing for the pickup image signal, the defocusing processing, the deforming processing, the resolution reducing processing or the tone resolution reducing processing, for example.

The image modification processing means performs the defocusing processing for placing an image based on the pickup image signal in a defocused state thereby to generate a motion picture in which a photogenic subject image is blurred. Alternatively, the image modification processing means performs the deforming processing for converting the two-dimensional positional information of the pickup image signal at an arbitrary ratio between the transverse and longitudinal lengths thereof, for example, thereby to generate an animated motion picture in which the configuration of the photogenic subject image is deformed.

Alternatively, the image modification processing means performs the resolution reducing processing for reducing the resolution of the pickup image signal thereby to generate a mosaic motion picture in which the contour of the photogenic subject is irregular. Alternatively, the image modification processing means performs the tone resolution reducing processing for reducing the tone resolution (for example, binarization) of the pickup image signal thereby to generate a chic and monotonous motion picture more similar to the substance as compared with the deforming processing. In this respect, "animated" means that the contour becomes rough in the deforming processing and "chic" means that the image is made monotonous while the shape and impression of the image is not changed.

According to such an image modification processing, it becomes possible to protect a portrait right of a calling party and also make the features and functions of the video telephone effective.

Figure 1:
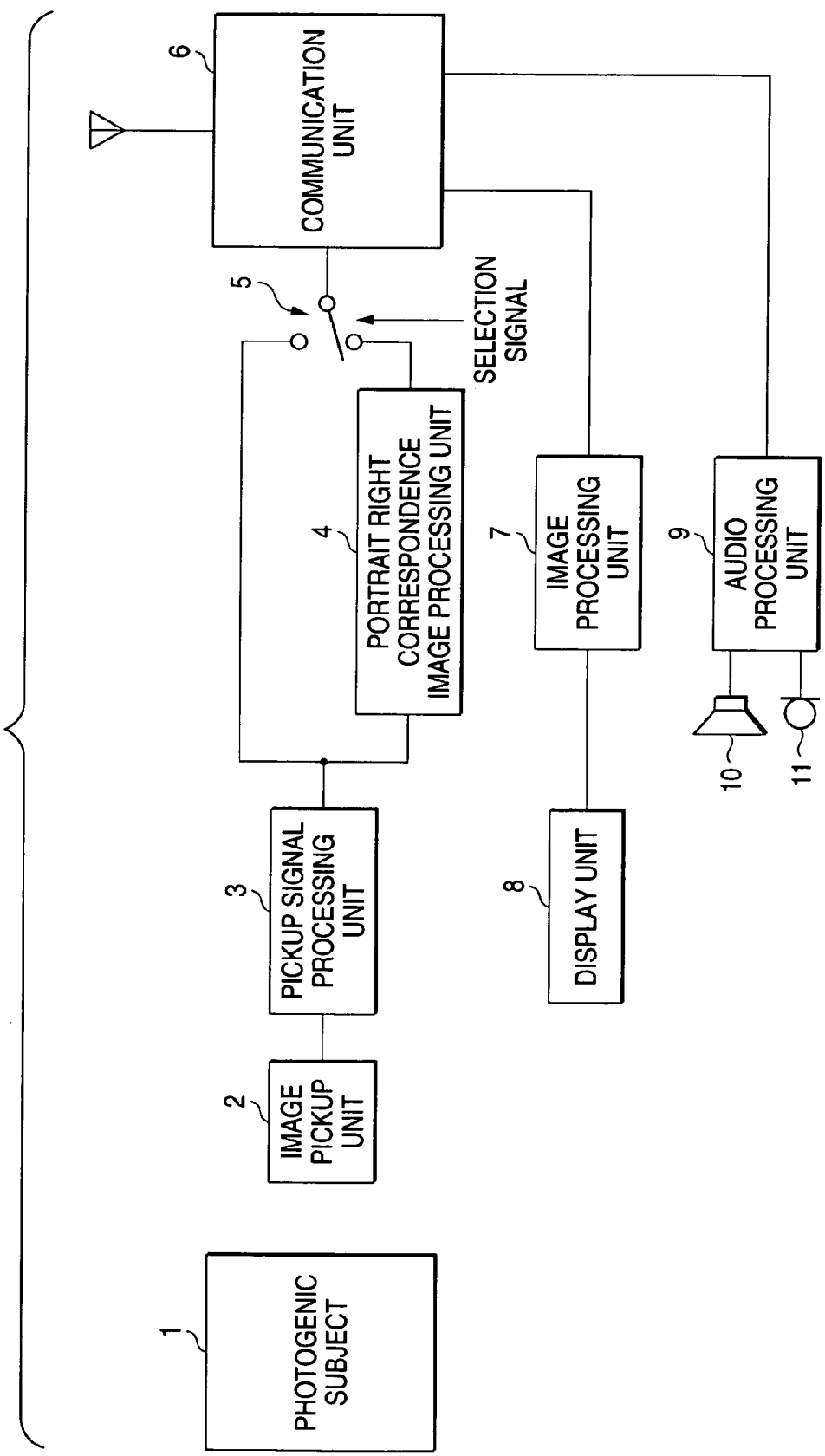
FIG. 1 is a diagram showing the configuration of a video telephone according to an embodiment of the invention.

In the drawings, a symbol 1 depicts a photogenic subject, 2 an image pickup unit, 3 a pickup signal processing unit, 4 a portrait right correspondence image processing unit, 5 an image signal selection unit and 6 a communication unit.

BEST MODE FOR CARRYING OUT THE INVENTION

An embodiment of the present invention will be explained with reference to the drawings.

FIG. 1 is a diagram for explaining the configuration of a video telephone according to the embodiment.

In the figure, the video telephone according to the embodiment is configured to include an image pickup unit 2 having an image pickup element such as a CCD (charge coupled device), a pickup signal processing unit 3, a portrait right correspondence image processing unit 4, an image signal selection unit 5, a communication unit 6, an image processing unit 7, a display unit 8 formed by a liquid display device etc., an audio processing unit 9, a speaker 10 and a microphone 11, whereby the video telephone pickups a photogenic subject 1 and transmits the pickup image. The pickup signal processing unit 3, the portrait right correspondence image processing unit 4, the image signal selection unit 5, the communication unit 6, the image processing unit 7 and the audio processing unit 9 are formed by a signal processing circuit using a semiconductor processor configured by an MPU, a DSP etc. or an ASIC and other electronic components.

A photogenic subject 1 is a subject to be pickup such as a calling party, and the image pickup unit 2 corresponds to an image pickup means for pickuping the photogenic subject and generating a pickup signal. That is, the image pickup unit 2 pickups a photogenic subject such as a calling party and a peripheral scene and outputs the pickup signal corresponding to the image of the photogenic subject 1 to the pickup signal processing unit 3.

The pickup signal processing unit 3 corresponds to a pickup signal processing means which processes the pickup signal and outputs a pickup image signal. That is, the pickup signal of the photogenic subject 1 pickup by the image pickup unit 2 is inputted to the pickup signal processing unit 3. Then, the pickup signal processing unit 3 processes the pickup signal to generate a pickup image signal which can be converted into a signal of a type suitable for communication using the video telephone.

The portrait right correspondence image processing unit 4 corresponds to an image modification processing means for converting the signal from the pickup signal processing unit into an image signal capable of protecting a portrait right. That is, the portrait right correspondence image processing unit 4 subjects the pickup image signal inputted from the pickup signal processing unit 3 to an image modification processing such as a defocusing processing so as to transmit an image in a defocused state, a deformation processing for converting the two-dimensional positional information of an image at an arbitrary ratio, a resolution reducing processing for reducing the resolution of an image, or a tone resolution reducing processing for reducing tone resolution of an image.

The image signal selection unit 5 corresponds to an image signal selection means for selecting one of the pickup image signal from the pickup signal processing means and a modified image signal from the portrait right correspondence image processing means. That is, the image signal selection unit selects one of the pickup image signal from the pickup signal processing unit 3 and the modified image signal from the portrait right correspondence image processing unit 4 in a switching manner by using a change-over switch, for example, to thereby send the modified image signal corresponding to an image subjected to the protection processing of the portrait right of a calling party by the image modification processing or send the pickup image signal representing the image of the pickup subject as being pickup.

The communication unit 6 corresponds to a communication means for transmitting the image signal outputted from the image signal selection means. That is, the communication unit 6 transmits the image signal outputted from the pickup signal processing unit 3 or the portrait right correspondence image processing unit 4 selected by the image signal selection unit 5 in a switching manner. The communication unit 6 also receives an input image signal transmitted from the partner side of the calling party. Although the communication unit 6 is arranged to also receive the input image signal transmitted from the partner side, it is possible to arrange a signal transmission unit and a signal receiving unit separately.

The image processing unit 7 converts the input image signal received at the communication unit 6 into a display signal of a type suitable for displaying on a screen. The display unit 8 displays image information based on the display signal outputted from the image processing unit 7. The audio processing unit 9 processes transmission voice received by the microphone 11 and received voice to be reproduced by the speaker 10.

Next, the operation of the video telephone according to the embodiment provided with the configuration described above will be explained in detail.

First, in the initial setting before starting speech using the video telephone, the image signal selection unit 5 is placed in a state of selecting the portrait right correspondence image processing unit 4 so that the modified image signal (an image signal for high-grade protection) from the portrait right correspondence image processing unit 4 is sent to the communication unit 6. Thus, at the time of speech, an image as being pickup faithful to the substance of a calling party is not transmitted, but an image signal subjected to the image modification processing such as the defocusing processed image, the deformation processed image, the low resolution image or the low tone image is transmitted to the partner side as the calling destination. Therefore, since a person of the calling destination can not determine the calling party from the displayed image, it is possible for the calling party to speak without minding the portrait right.

The calling party may at first set the portrait right correspondence image processing unit 4 to subject the pickup image signal to the image modification processing so as to generate an image signal for the high-grade protection, and there after change the degree of the image modification processing so as to perform the image modification processing for the low-grade protection.

When the speech is started, the photogenic subject 1 such as the calling party and the peripheral scene is pickup by the image pickup unit 2. Then, the image pickup unit 2 generates the pickup signal corresponding to the image of the photogenic subject 1 thus pickup and sends the pickup signal to the pickup signal processing unit 3.

The pickup signal processing unit 3 processes the pickup signal from the image pickup unit 2 thereby to generate the pickup image signal of the type to be transmitted from the video telephone. The pickup image signal is outputted to the portrait right correspondence image processing unit 4 and subjected to the image modification processing so as to protect the portrait right (protect the privacy of the calling party). In the image modification processing, the processing such as the defocusing processing, the deformation processing, the resolution reducing processing or the tone resolution reducing processing is performed.

Figure 2:
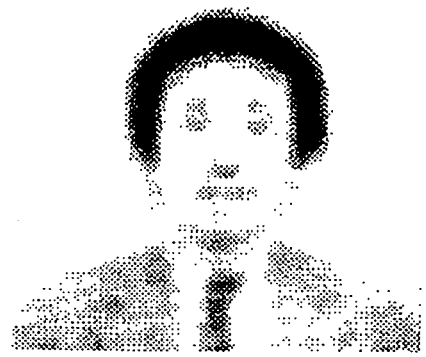
FIG. 2 is an explanatory diagram showing an image subjected to a defocusing processing as an example of an image modification processing.
Figure 3:
FIG. 3 is an explanatory diagram showing an image subjected to a deforming processing (a transverse direction elongating processing) as an example of the image modification processing.
Figure 4:
FIG. 4 is an explanatory diagram showing an image subjected to the deforming processing (a longitudinal direction elongating processing) as an example of the image modification processing.
Figure 5:
FIG. 5 is an explanatory diagram showing an image subjected to the deforming processing (a center portion transverse and longitudinal direction elongating processing) as an example of the image modification processing.
Figure 6:
FIG. 6 is an explanatory diagram showing an image subjected to the deforming processing (a peripheral portion transverse and longitudinal direction elongating processing) as an example of the image modification processing.
Figure 7:
FIG. 7 is an explanatory diagram showing an image subjected to the deforming processing (a spherical extending processing) as an example of the image modification processing.

In the defocusing processing as the first example of the image modification processing, the pickup image is defocused to form an image shown in FIG. 2 thereby to protect the portrait right of the image. In this respect, FIG. 2 is a diagram for explaining the image subjected to the defocusing processing. That is, when the image is subjected to the high-grade defocusing processing, the image is modified such that the person at the calling destination can not determine as to who is the calling party but recognize only the motion of the photogenic subject 1. Alternatively, when the image is subjected to the low-grade defocusing processing, the image is modified such that the person at the calling destination can not determine the details of expression, glow and color of the face of the calling party but recognize the motion of the photogenic subject and almost recognize as to who is the calling party. In the defocusing processing, it is possible to provide defocusing directionality so that the image is defocused in an arbitrary direction.

In the deforming processing as the second example of the image modification processing, the two-dimensional positional information of the image is converted at an arbitrary ratio thereby to change the configuration of the photogenic subject, whereby images as shown in FIGS. 3 to 7 are formed thereby to protect the portrait right of the image. In this respect, FIGS. 3 to 7 are diagrams for explaining images subjected to the deforming processing, wherein FIG. 3, FIG. 4, FIG. 5, FIG. 6 and FIG. 7 show images subjected to a transverse direction elongating processing, a longitudinal direction elongating processing, a center portion transverse and longitudinal direction elongating processing, a peripheral portion transverse and longitudinal direction elongating processing, and a spherical extending processing, respectively. In this manner, the feature of the photogenic subject 1 is emphasized or de-emphasized through the deforming processing. In this case, when the two-dimensional positional information is converted with different ratios in the two-dimensional directions, the degree of the deforming becomes high and so an animated image can be obtained.

In the deformation processing, it is possible to emphasize a particular potion of the image, or deform the image in other shape such as a trapezoidal shape not being limited to the elongating in the transverse or longitudinal direction or the extension in the spherical shape.

Figure 8:
FIG. 8 is an explanatory diagram showing an image subjected to a tone resolution reducing processing as an example of the image modification processing.

In the tone resolution reducing processing as the third example of the image modification processing, the tone resolution of the pickup image is reduced, so that an image as shown in FIG. 8 is formed thereby to protect the portrait right of the image. In this respect, FIG. 8 is an explanatory diagram showing an image subjected to the tone resolution reducing processing and showing an example of binarized monochrome image. When the image is binarized in this manner, a chic (monotonous) image can be generated. In contrast to the modulated and showy impression image in both color and shape formed by the deforming processing, the image thus generated is a monotonous image of an original image which is same in the shape and image as the original image, whereby an image from which only contour such as eye, nose, mouth etc. can be recognized is obtained.

Figure 9:
FIG. 9 is an explanatory diagram showing an image subjected to a resolution reducing processing as an example of the image modification processing.

In the resolution reducing processing as the fourth example of the image modification processing, the resolution, that is, the positional resolution of the pickup image is reduced, whereby an image as shown in FIG. 9 is formed thereby to protect the portrait right of the image. In this respect, FIG. 9 is an explanatory diagram showing the image subjected to the resolution reducing processing. The image thus generated is a mosaic image, and the impression thereof changes depending on the degree of the resolution reducing processing. When the degree of the resolution reduction becomes large, portions equal to or less than 1 cm of the displayed image, for example, can not be resolved or discriminated and so a curved portion such as a face of the photogenic subject is displayed as a shape near a quadrangle. In the case of converting the two-dimensional positional information within the image in the deforming processing, when the positional resolutions in the transverse and longitudinal directions are reduced at a constant ratio, effects similar to that of the resolution reducing processing can be obtained.

Figure 10:
FIG. 10 is an explanatory diagram showing an image subjected to a diffusing image processing as an example of the image modification processing.
Figure 11:
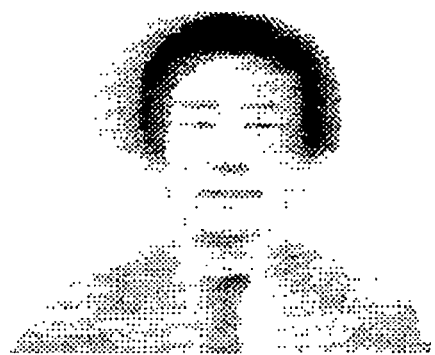
FIG. 11 is an explanatory diagram showing an image subjected to a transverse blurring processing as an example of the image modification processing.
Figure 12:
FIG. 12 is an explanatory diagram showing an image subjected to a contour extracting processing as an example of the image modification processing.
Figure 13:
FIG. 13 is an explanatory diagram showing an image subjected to an emboss processing as an example of the image modification processing.

The image modification processings are not limited to the aforesaid examples, and various kinds of modifications may be raised. For example, a modified image may be generated by subjecting an image to a diffusing image processing as shown in FIG. 10, a transverse blurring processing as shown in FIG. 11, a contour extracting processing as shown in FIG. 12 or an emboss processing as shown in FIG. 13 thereby to protect the portrait right of the image. The examples of the respective image modification processings including the aforesaid four examples may be executed by a semiconductor processor such as an MPU by using one or the combination of the various kinds of known image processing techniques.

The modified image signal thus processed is transmitted from the communication unit 6 based on the selection by the image signal selection unit 5. The image signal selection unit 5 receives a control signal based on the operational determination of the calling party, and is selectively operated in response to the control signal to further process the pickup image signal thereby to protect the portrait right or to transmit the pickup image signal as it is. To be more concrete, when a calling party can confirm the calling destination and determines that an image faithful to the substance of the calling party may be transmitted, the calling party selects through the operation of an operation unit (not shown) so as to transmit the pickup image signal from the pickup signal processing unit 3 to the communication unit 6, for example. Thus, a selection signal for switching from the portrait right correspondence image processing unit 4 to the pickup signal processing unit 3 is outputted to the image signal selection unit 5. The image signal selection unit 5 changes the change-over switch, for example, from the portrait right correspondence image processing unit 4 to the pickup signal processing unit 3 based on the selection signal.

In contrast, when the calling party desires to speak while securing the portrait right, the image signal selection unit 5 is kept to select the portrait right correspondence image processing unit 4. This switching operation is performed at a proper timing during the speech depending on the determination of the calling party. Then, the communication unit 6 transmits the output image signal selected by the image signal selection unit 5.

As described above, the video telephone according to the embodiment is arranged in a manner that the portrait right correspondence image processing unit 4 processes the pickup image so as to protect the portrait right, and the image signal selection unit 5 selects the transmission of the image processed to protect the portrait right or the transmission of the image as being pickup. Thus, it is possible to speak while seeing a moving image and protecting the portrait right such as privacy of the calling party. Further, since an amount of data of the image signal to be transmitted can be reduced by the image modification processing, it is possible to transmit and receive the image at a low communication speed at the time of starting the communication, and change the communication speed to a high speed after confirming the partner sides to each other thereby to transmit and receive the image at the high communication speed, so that the image communication can be performed efficiently.

In the aforesaid explanation, although the calling party manually switches the image signal selection unit 5 by means of the operation unit, the video telephone according to the embodiment may be configured in a manner that a called party recognition unit is provided so that the image is changed automatically after confirming the authentication using a telephone number or a password. For example, in the case where a telephone number of a person on the partner side is registered in the dial memory of the video telephone, when a call is originated from the telephone number thus registered which is checked to be OK in sending the normal image, it may be set that the "authentication confirmation" is completed by recognizing the telephone number of a calling party thereby to switch to the normal image as being pickup or the image for the low-grade protection from the image for the high-grade protection. Alternatively, in the case where a telephone number of a person on the partner side is not registered in the dial memory but passwords of the calling and called parties are exchanged to each other in advance, when the password of the person on the partner side thus exchanged is transmitted, it may be set that the "authentication confirmation" is completed by recognizing this password. Alternatively, it may be set that the "authentication confirmation" is completed by recognizing both the telephone number of the person on the partner side and the password of the person on the partner side which was exchanged to each other in advance.

In mobile communication devices including portable telephones of various kinds of types such as PDC, PHS, IMT-2000 (W-CDMA etc.), the video telephone according to the invention is applicable to ones configured so as to be able to transmit and receive an image. Incidentally, in the aforesaid embodiment, although the explanation has been made that the output image signal is transmitted through the antenna in the form of radio communication, the present invention is not limited thereto. The present invention is also applicable to such a configuration that an image is transmitted and received in the form of wire communication using the communication network such as ISDN, PSTN. Further, the communication network to which the invention is applicable may be a WLL system (Wireless Local Loop System) for coupling terminal devices of the video telephones with the base station connected to the switching equipment of a telephone exchange station through a wire communication means and performing transmission and reception of images, in addition to the mobile communication network, the telephone network using ISDN or PSTN.

INDUSTRIAL APPLICABILITY

As described above, according to the video telephone of the invention, when performing a speech by applying the invention to telephones including mobile communication devices such as portable telephones, it is possible to speak while seeing a motion picture of a partner side and while protecting the portrait right of a calling party using the video telephone as the need arises. Thus, the invention is advantageous in that the original function of the video telephone can be attained sufficiently.

The invention claimed is:

1. A video telephone comprising:
   image pickup means which captures an image of a subject and generates a pickup signal;
   pickup signal processing means which processes the pickup signal and outputs a pickup image signal;
   processing means including a microprocessor for executing an image modification program for implementing one or more image modification processing techniques which subjects the pickup image signal to an image modification processing to produce a modified image signal for protecting a portrait right;
   image signal selection means which selects one of the pickup image signal from the pickup signal processing means and the modified image signal; and
   communication means which transmits an output image signal from the image signal selection means.

2. A video telephone according to claim 1, wherein the image signal selection means selects and outputs the modified image signal from the processing means at a time of starting communication, and thereafter selects and outputs the pickup image signal from the pickup signal processing means in response to an operational instruction from a calling party.

3. A video telephone according to claim 1, wherein the image signal selection means selects and outputs the modified image signal from the processing means at a time of starting communication, and thereafter selects and outputs the pickup image signal from the pickup signal processing means in response to confirmation of authentication of a partner side of a calling party.

4. A video telephone according to claim 1, wherein the processing means performs a defocusing processing for placing an image based on the pickup image signal in a defocused state.

5. A video telephone according to claim 1, wherein the processing means performs a deforming processing for converting two-dimensional positional information of pixels in the pickup image signal at an arbitrary ratio.

6. A video telephone according to claim 1, wherein the processing means performs a resolution reducing processing for reducing a resolution of the pickup image signal.

7. A video telephone according to claim 1, wherein the processing means performs a tone resolution reducing processing for reducing a tone resolution of the pickup image signal.

8. A video telephone according to claim 1 wherein said image modification processing is accomplished using a multi-purpose CPU or a digital signal processor.

9. A video telephone according to claim 1 wherein said processing means is a digital signal processor.

10. A video telephone according to claim 1 wherein said processing means is a multi-purpose CPU.

11. A video telephone comprising:
    image pickup means which captures an image of a subject and generates a pickup signal;
    pickup signal processing means which processes the pickup signal and outputs a pickup image signal;
    image modification processing means for executing a program which subjects the pickup image signal to an image modification processing for protecting a portrait right, said image modification including one or more of defocusing processing, deforming processing, resolution reducing processing, tone resolution reducing processing, diffusing image processing, transverse blurring processing, and contour extracting processing;
    image signal selection means which selects one of the pickup image signal from the pickup signal processing means and a modified image signal from the image modification processing means; and
    communication means which transmits an output image signal from the image signal selection means.

12. A video telephone according to claim 11, wherein the image signal selection means selects and outputs the modified image signal from the image modification processing means at a time of starting communication, and thereafter selects and outputs the pickup image signal from the pickup signal processing means in response to an operational instruction from a calling party.

13. A video telephone according to claim 11, wherein the image signal selection means selects and outputs the modified image signal from the image modification processing means at a time of starting communication, and thereafter selects and outputs the pickup image signal from the pickup signal processing means in response to confirmation of authentication of a partner side of a calling party.

14. A video telephone comprising:
    image pickup means which captures an image of a subject and generates a pickup signal;
    pickup signal processing means which processes the pickup signal and outputs a pickup image signal;
    image modification processing means for executing a program which subjects the pickup image signal to defocusing processing for placing an image based on the pickup image signal in a defocused state;
    image signal selection means which selects one of the pickup image signal from the pickup signal processing means and a modified image signal from the image modification processing means; and
    communication means which transmits an output image signal from the image signal selection means.

15. A video telephone according to claim 14, wherein the image signal selection means selects and outputs the modified image signal from the image modification processing means at a time of starting communication, and thereafter selects and outputs the pickup image signal from the pickup signal processing means in response to an operational instruction from a calling party.

16. A video telephone according to claim 14, wherein the image signal selection means selects and outputs the modified image signal from the image modification processing means at a time of starting communication, and thereafter selects and outputs the pickup image signal from the pickup signal processing means in response to confirmation of authentication of a partner side of a calling party.

17. A video telephone comprising:
    image pickup means which captures an image of a subject and generates a pickup signal;
    pickup signal processing means which processes the pickup signal and outputs a pickup image signal;
    image modification processing means for executing a program which subjects the pickup image signal to deforming processing for converting two-dimensional positional information of pixels in the pickup image signal at an arbitrary ratio;

image signal selection means which selects one of the pickup image signal from the pickup signal processing means and a modified image signal from the image modification processing means; and communication means which transmits an output image signal from the image signal selection means.

18. A video telephone according to claim 17, wherein the image signal selection means selects and outputs the modified image signal from the image modification processing means at a time of starting communication, and thereafter selects and outputs the pickup image signal from the pickup signal processing means in response to an operational instruction from a calling party.

19. A video telephone according to claim 17, wherein the image signal selection means selects and outputs the modified image signal from the image modification processing means at a time of starting communication, and thereafter selects and outputs the pickup image signal from the pickup signal processing means in response to confirmation of authentication of a partner side of a calling party.

20. A video telephone comprising:

image pickup means which captures an image of a subject and generates a pickup signal;

pickup signal processing means which processes the pickup signal and outputs a pickup image signal;

image modification processing means for executing a program which subjects the pickup image signal to resolution reducing processing for reducing a resolution of the pickup image signal;

image signal selection means which selects one of the pickup image signal from the pickup signal processing means and a modified image signal from the image modification processing means; and communication means which transmits an output image signal from the image signal selection means.

21. A video telephone according to claim 20, wherein the image signal selection means selects and outputs the modified image signal from the image modification processing means at a time of starting communication, and thereafter selects and outputs the pickup image signal from the pickup signal processing means in response to an operational instruction from a calling party.

22. A video telephone according to claim 20, wherein the image signal selection means selects and outputs the modified image signal from the image modification processing means at a time of starting communication, and thereafter selects and outputs the pickup image signal from the pickup signal processing means in response to confirmation of authentication of a partner side of a calling party.

23. A video telephone comprising:

image pickup means which captures an image of a subject and generates a pickup signal;

pickup signal processing means which processes the pickup signal and outputs a pickup image signal;

image modification processing means for executing a program which subjects the pickup image signal to tone resolution reducing processing for reducing a tone resolution of the pickup image signal;

image signal selection means which selects one of the pickup image signal from the pickup signal processing means and a modified image signal from the image modification processing means; and communication means which transmits an output image signal from the image signal selection means.

24. A video telephone according to claim 23, wherein the image signal selection means selects and outputs the modified image signal from the image modification processing means at a time of starting communication, and thereafter selects and outputs the pickup image signal from the pickup signal processing means in response to an operational instruction from a calling party.

25. A video telephone according to claim 23, wherein the image signal selection means selects and outputs the modified image signal from the image modification processing means at a time of starting communication, and thereafter selects and outputs the pickup image signal from the pickup signal processing means in response to confirmation of authentication of a partner side of a calling party.

* * * * *